United States Patent [19]

Yamato et al.

[11] Patent Number: 4,840,156
[45] Date of Patent: Jun. 20, 1989

[54] INTAKE AIR QUALITY CONTROL METHOD FOR INTERNAL COMBUSTION ENGINES AT TERMINATION OF FUEL CUT OPERATION

[75] Inventors: Akihiro Yamato, Shiki; Makoto Hashiguchi, Kawagoe, both of Japan

[73] Assignee: Honda Giken Kogyo Kabushiki Kaisha, Tokyo, Japan

[21] Appl. No.: 139,068

[22] Filed: Dec. 24, 1987

Related U.S. Application Data

[63] Continuation of Ser. No. 615,050, May 29, 1984, abandoned.

[30] Foreign Application Priority Data

Jun. 16, 1983 [JP] Japan .................. 58-108239

[51] Int. Cl.⁴ ............................................. F02M 39/00
[52] U.S. Cl. ................................ 123/339; 123/385
[58] Field of Search ............... 123/585, 586, 587, 588, 123/589, 339

[56] References Cited

U.S. PATENT DOCUMENTS

| | | | |
|---|---|---|---|
| 4,336,729 | 6/1982 | Senence | 123/585 |
| 4,337,742 | 7/1982 | Carlson | 123/585 |
| 4,364,349 | 12/1982 | Miyagi | 123/339 |
| 4,375,208 | 3/1983 | Furuhashi | 123/588 |
| 4,438,744 | 3/1984 | Hasigawa | 123/585 |
| 4,453,514 | 6/1984 | Martinsons | 123/585 |
| 4,467,761 | 8/1984 | Hasegawa | 123/339 |
| 4,475,505 | 10/1984 | Hasegawa | 123/339 |

Primary Examiner—Carl Stuart Miller
Attorney, Agent, or Firm—Lyon & Lyon

[57] ABSTRACT

A method of controlling the quantity of intake air being supplied to an internal combustion engine equipped with means for increasing the intake air quantity by a required amount in response to operating conditions of the engine. The intake air quantity increasing means is actuated for a limited period of time to increase the quantity of intake air when it is determined that a predetermined condition is satisfied for terminating interruption of the fuel supply to the engine, which is carried out at deceleration of the engine. Preferably, the intake air quantity increasing means is actuated when the rate of decrease in the rotational speed of the engine is larger than a predetermined value, while the predetermined condition is determined to be satisfied.

3 Claims, 4 Drawing Sheets

INTAKE AIR QUALITY CONTROL METHOD FOR INTERNAL COMBUSTION ENGINES AT TERMINATION OF FUEL CUT OPERATION

This application is a continuation of application Ser. No. 615,050, filed 5-29-84 abandoned.

BACKGROUND OF THE INVENTION

This invention relates to an intake air quantity control method for an internal combustion engine, and more particularly to a method of this kind which is adapted to supply the engine with a required amount of intake air at transition of engine operation from a condition wherein fuel cut is to be effected to a condition wherein the normal fuel supply to the engine is to be effected, to thereby prevent engine stall at such transition.

It is generally known that the mass of air sucked into a cylinder of the engine per suction stroke thereof is a function of the valve opening of the throttle valve, the engine rotational speed, the configuration of the intake pipe of the engine, and other parameters, and accordingly, it varies in response to changes in these parameters. Also, as generally known, the mass of air sucked into an engine cylinder per suction stroke is represented in terms of charging efficiency of the engine.

When the engine is operating in a low speed region with the clutch disengaged to disconnect the output shaft of the engine from a driven shaft coupled to the wheels of a vehicle and also with the throttle valve fully closed, the engine is supplied with a quantity of intake air corresponding to the charging efficiency of the engine which is substantially equal to a quantity of intake air required by engine loads which are determined by the frictional resistance of sliding parts of the engine, etc., so long as the engine speed remains in the vicinity of its idling rpm, thereby maintaining the engine speed substantially constant. However, when the engine is operating in a high speed region with the clutch disengaged and the throttle valve fully closed, the charging efficiency of the engine becomes too small to maintain the engine speed as it is, resulting in a sudden drop in the engine speed.

Such sudden drop in the engine speed can frequently occur particularly in an internal combustion engine equipped with an electronic fuel injection system at fuel-cut operation which is usually effected at deceleration of the engine with the throttle valve fully closed. Therefore, there exists a fear of engine stall at the transition of engine operation from a condition wherein fuel cut is to be effected to a condition wherein the fuel supply to the engine is to be effected. In order to prevent such engine stall, the charging efficiency of the engine has to be increased.

SUMMARY OF THE INVENTION

It is the object of the invention to provide an intake air quantity control method for an internal combustion engine, which can positively prevent engine stall even in the event that the rotational speed of the engine suddenly decreases when power transmission means of the engine, such as the clutch, becomes disengaged to disconnect the output shaft of the engine from a driven shaft of same, while the engine is decelerating with the throttle valve fully closed, particularly while the engine is decelerating in a fuel cut condition.

According to the invention, an intake air quantity control method is provided for an internal combustion engine equipped with means for increasing the quantity of intake air being supplied to the engine by a required amount in response to operating conditions of the engine. The method of the invention is characterized by comprising the following steps: (a) determining whether or not a predetermined condition is satisfied for terminating interruption of the fuel supply to the engine, which is carried out at deceleration of the engine; and (b) actuating the intake air quantity increasing means for a limited period of time to increase the quantity of intake air, when it is determined that the predetermined condition is satisfied.

Preferably, the method of the invention includes the steps of detecting a rate of decrease in the rotational speed of the engine, and comparing the detected rate of decrease with a predetermined value. The aforementioned step (b) is executed when it is determined at the step (a) that the predetermined condition for terminating the interruption of fuel supply is satisfied, and at the same time the detected rate of decrease is larger than the predetermined value.

Also preferably, the method of the invention may further include increasing the fuel quantity being supplied to the engine at the same time when the above step (b) is executed.

The above and other objects, features and advantages of the invention will be more apparent from the ensuing detailed description taken in conjunction with the accompanying drawings.

DETAILED DESCRIPTION

The method of the invention will be described in detail with reference to the accompanying drawings.

Figure 1:
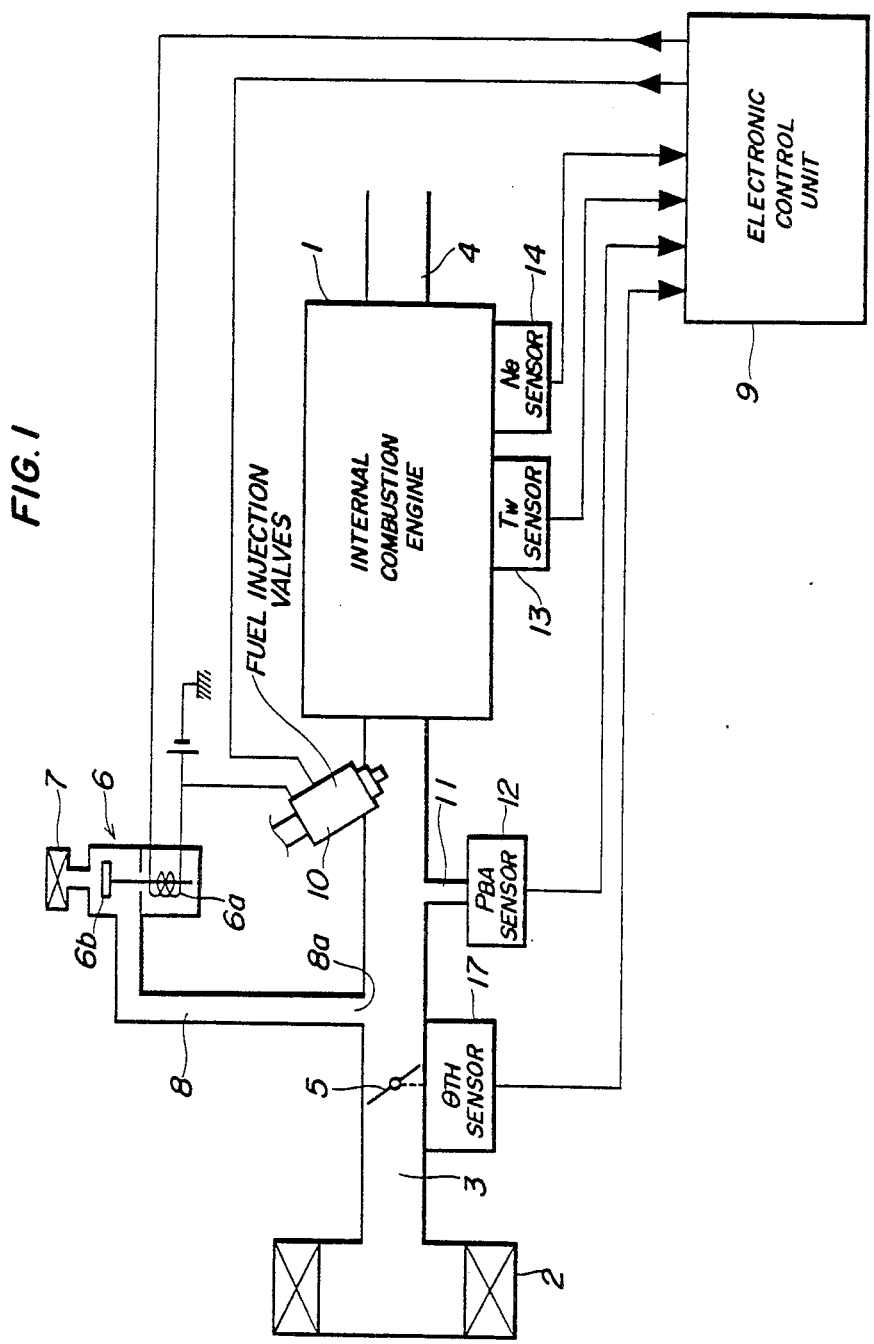
FIG. 1 is a block diagram illustrating the whole arrangement of an intake air quantity control system to which is applied the method of the invention.

Referring first to FIG. 1, an intake air quantity control system for internal combustion engines is schematically illustrated, to which is applied the method of the invention. In FIG. 1, reference numeral 1 designates an internal combustion engine which may be a four-cylinder type, and to which are connected an intake pipe 3 with an air cleaner 2 mounted at its open end and an exhaust pipe 4, at an intake side and an exhaust side of the engine 1, respectively. A throttle valve 5 is arranged within the intake pipe 3, and an air passage 8 opens at its one end 8a in the intake pipe 3 at a location downstream of the throttle valve 5. The other end of the air passage 8 communicates with the atmosphere and is provided with an air cleaner 7. A supplementary air quantity control valve (hereinafter merely called "the control valve") 6 is arranged across the air passage 8 to control the quantity of supplementary air being supplied to the engine 1 through the air passage 8. This control valve 6 is a normally closed type and comprises a solenoid 6a and a valve body 6b disposed to open the air passage 8 when the solenoid 6a is energized. The solenoid 6a is electrically connected to an electronic control unit (hereinafter called "the ECU") 9. Fuel injection valves 10 are projected into the intake pipe 3 at a location between the engine 1 and the open end 8a of the air passage 8, and connected to a fuel pump, not shown, while they are electrically connected to the ECU 9.

A throttle valve opening ($\theta$TH) sensor 17 is connected to the throttle valve 5, and an absolute pressure (PBA) sensor 12 is provided in communication with the intake pipe 3 through a conduit 11 at a location downstream of the open end 8a of the air passage 8, while an engine cooling water temperature (TW) sensor 13 and an engine rotational speed-sensor (hereinafter called "the Ne sensor") 14 are both arranged in the main body of the engine 1. All the sensors are electrically connected to the ECU 9.

The intake air quantity control system constructed as above operates as follows: The ECU 9 is supplied with engine operation parameter signals from the throttle valve opening ($\theta$TH) sensor 17, the absolute pressure (PBA) sensor 12, the engine cooling water temperature (TW) sensor 13, and the Ne sensor 14. The ECU 9 determines operating conditions of the engine 1 on the basis of the read values of these engine operation parameter signals, and then calculates a desired quantity of fuel to be supplied to the engine 1, that is, a desired valve opening period of the fuel injection valves 10, and also a desired quantity of supplementary air to be supplied to the engine 1, that is, a desired valve opening period of the control valve 6, on the basis of the determined operating conditions of the engine. Then, the ECU 9 supplies driving pulses corresponding to the calculated values to the fuel injection valves 10 and the control valve 6.

The control valve 6 has its solenoid 6a energized by each of its driving pulses to open its valve body 6b, thereby opening the air passage 8 for a period of time corresponding to its calculated valve opening period value so that a quantity of supplementary air corresponding to the calculated valve opening period value is supplied to the engine 1 through the air passage 8 and the intake pipe 3.

The fuel injection valves 10 are energized by each of its driving pulses to open for a period of time corresponding to its calculated valve opening period value to inject fuel into the intake pipe 3. The ECU 9 operates so as to supply an air/fuel mixture having a required air/fuel ratio to the engine 1.

Figure 2:
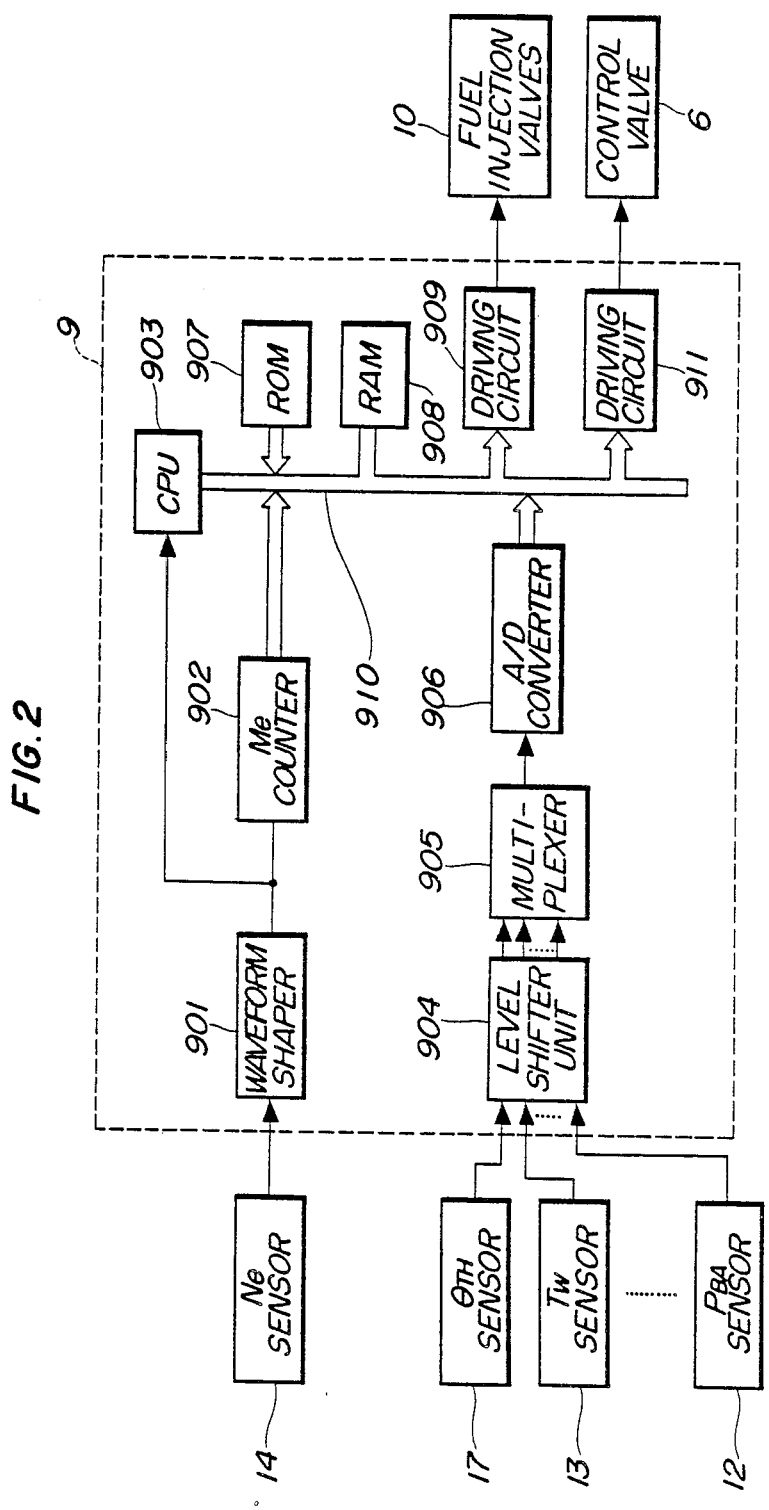
FIG. 2 is a circuit diagram illustrating an electrical circuit within the electronic control unit (ECU) in FIG. 1.

FIG. 2 shows a circuit configuration within the ECU 9 in FIG. 1. An output signal indicative of the engine rotational speed from the Ne sensor 14 in FIG. 1 is applied to a waveform shaper 901, wherein it has its pulse waveform shaped, and supplied to a central processing unit (hereinafter called "the CPU") 903 as a top dead center (TDC) signal, as well as to an Me value counter 902. The Me value counter 902 counts the interval of time between a preceding pulse of the TDC signal and a present pulse of the same signal, inputted thereto from the Ne sensor 1, and therefore its counted value Me is proportional to the reciprocal of the actual engine rotational speed Ne. The Me value counter 902 supplies the counted value Me to the CPU 903 via a data bus 910.

The respective output signals from the throttle valve opening ($\theta$TH) sensor 17, the intake pipe absolute pressure (PBA) sensor 12, the engine cooling water temperature (TW) sensor 13, etc. have their voltage levels shifted to a predetermined voltage level by a level shifter unit 904 and successively applied to an analog-to-digital converter 906 through a multiplexer 905. The analog-to-digital converter 906 successively converts into digital signals analog output voltages from the aforementioned various sensors, and the resulting digital signals are supplied to the CPU 903 via the data bus 910.

Further connected to the CPU 903 via the data bus 910 are a read-only memory (hereinafter called "the ROM") 907, a random access memory (hereinafter called "the RAM") 908 and driving circuits 909 and 911. The RAM 908 temporarily stores various calculated values from the CPU 903, while the ROM 907 stores a control program which is executed by the CPU 903, etc.

The CPU 903 executes the control program stored in the ROM 907 in response to the values of the aforementioned various engine operation parameter signals, to determine operating conditions of the engine, as hereinafter described in detail, and calculate the valve opening period of the control valve 6 for control of the supplementary air quantity, as well as the valve opening period TOUT of the fuel injection valves 10. The CPU 903 supplies the driving circuits 911 and 909 with control signals corresponding to the calculated valve opening period values of the control valve 6 and the fuel injection valves 10, respectively, through the data bus 910. The driving circuit 909 is responsive to the control signal supplied thereto to supply driving pulses to the fuel injection valves 10 to energize or deenergize same, while the driving circuit 911 is responsive to its control signal to supply driving pulses to the control valve 6 to energize or deenergize same.

The valve opening period TOUT of the fuel injection valves 10 is calculated by the use of the following equation:

$$TOUT = Ti \times KAFC \times K1 + K2 \quad (1)$$

where Ti represents a basic value of the fuel injection period of the fuel injection valves 10, which is read from the ROM 907 as a function of values of intake pipe absolute pressure PBA and engine rotational speed Ne, for instance. KAFC is a fuel increasing coefficient applicable after termination of a fuel cut operation of the engine for increasing the quantity of fuel being supplied to the engine. The reason for increasing the fuel quantity after the termination of a fuel cut operation by the use of the coefficient KAFC is as follows: During fuel cut operation of the engine, fuel that adheres to the inner peripheral surface of the intake pipe 3 is vaporized. Therefore, immediately after the fuel cut operation has been terminated, part of fuel supplied to the engine adheres to the inner peripheral surface of the intake pipe 3. This causes the air-fuel mixture supplied to the engine cylinders to be too lean at the resumption of a fuel supplied operation immediately following the fuel cut operation, for a period of time required for fuel adhering to the inner peripheral surface of the intake pipe 3 to become equal in quantity to the fuel vaporized during the fuel cut operation. To prevent this phenomenon, the above fuel increasing coefficient KAFC is applied after the termination of a fuel cut operation, so as to increase the fuel quantity by an amount corresponding to the quantity of fuel adhering to the inner peripheral surface of the intake pipe 3.

In the equation (1), K1 and K2 represent other correction coefficients and variables having their values calculated, by respective predetermined equations, on the basis of values of engine operation parameter signals from the aforementioned various sensors, so as to optimize the startability, emission characteristics, fuel consumption, accelerability, etc. of the engine.

Figure 3:
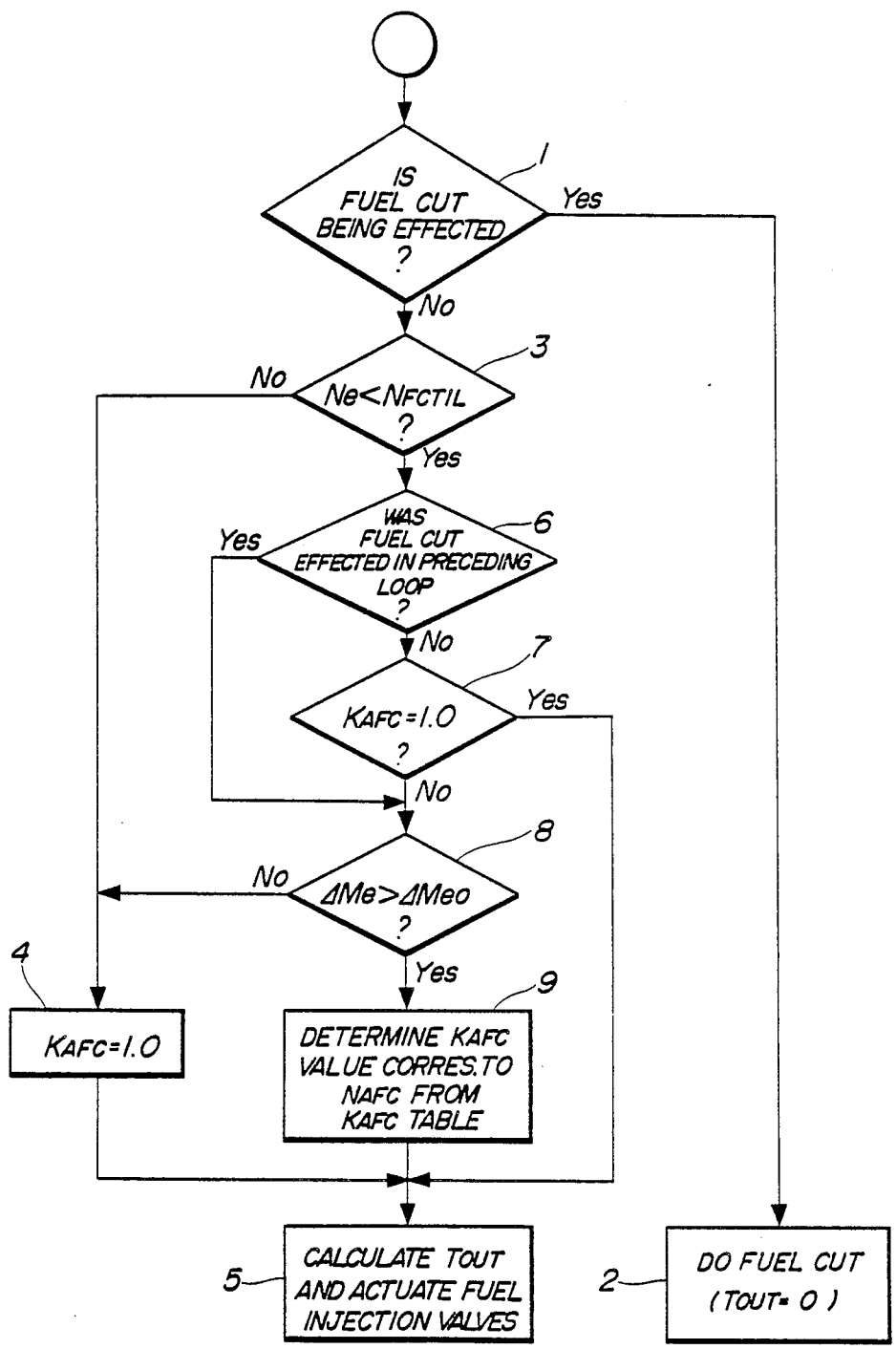
FIG. 3 is a flow chart of a subroutine executed within the ECU for setting the value of a fuel increasing coefficient KAFC which is used to calculate the valve opening period of fuel injection valves immediately after the recovery of the engine from a fuel cut effecting condition.

FIG. 3 shows a flow chart of a subroutine for calculating the fuel increasing coefficient KAFC. The present program is executed within the CPU 903 each time each pulse of the TDC signal is inputted to the CPU 903.

First, at the step 1, it is determined whether or not the engine is operating in a predetermined operating condition wherein fuel cut is to be effected. At this step 1, for instance, if the rotational speed Ne of the engine falls within a range between a predetermined value NFCT1L, e.g. 850 rpm, which is higher than the idling speed of the engine, and another predetermined value NFCT2L, e.g. 2000 rpm, the engine is determined to be operating in the fuel cut effecting condition, on condition that the throttle valve 5 is in its fully closed position. On he other hand, if the engine speed Ne is higher than the predetermined value NFCT2L, the engine is determined to be in the fuel cut effecting condition, on condition that the intake pipe absolute pressure PBA is lower than a predetermined fuel cut effecting value PBAFC which is set to larger values as the engine speed Ne increases. If the determination at the step 1 provides an affirmative answer, the program proceeds to the step 2 to carry out fuel cut.

If it is determined at the step 1 that the engine is not in the fuel cut effecting condition, a determination is then made as to whether or not the engine speed Ne is lower than the above predetermined value NFCT1L (850 rpm), at the step 3. When the engine speed Ne is higher than the predetermined value NFCT1L even after the termination of a fuel cut operation, there is no fear of engine stall which can be caused by leaning of the mixture even if no fuel increasing operation is carried out. Therefore, if the answer to the question of step 3 is no, the program directly proceeds to the step 4 to set the fuel increasing coefficient KAFC to 1, without executing the steps 6 through 9, hereinafter referred to. Then, the set value of the coefficient KAFC is applied to the aforementioned equation (1) to calculate the valve opening period TOUT of the fuel injection valves 10, and the fuel injection valves 10 are actuated with a valve opening period corresponding to the calculated value, at the step 5.

If the answer to the question at the step 3 is yes, that is, when the engine rotational speed Ne is lower than the predetermined value NFCT1L after the termination of a fuel cut operation, the program proceeds to the step 6 wherein it is determined whether or not fuel cut was effected in the preceding loop. If fuel cut was effected in the preceding loop, that is, if the present loop is a first loop to be executed immediately after the termination of a fuel cut operation, the program skips the step 7, hereinafter referred to, and directly proceeds to the step 8 to determine whether or not the rate of decrease in the engine speed Ne is larger than a predetermined value $\Delta$MeO. The rate of decrease in the engine speed Ne is calculated as a difference $\Delta$Me between a count value Men counted by the Me value counter 902 in FIG. 2 upon generation of the present pulse of the TDC signal, and a count value Men−1 counted upon generation of the preceding pulse of the same signal (i.e. $\Delta$Me=Men−Men−1). Thus, at the step 8, it is determined whether or not this difference $\Delta$Me is larger than the predetermined value $\Delta$MeO (e.g. 3 ms).

If it is determined at the step 8 that the difference $\Delta$Me is smaller than the predetermined value $\Delta$MeO, that is, when the rate of decrease in the engine speed Ne is small, it is judged that there is no fear of engine stall, and therefore the program proceeds to the aforementioned step 4.

If the answer to the question at the step 8 is yes, that is, when the engine speed Ne after the termination of a fuel cut operation is lower than the predetermined rotational speed NFCT1L and at the same time the rate of decrease in the engine speed Ne is large (i.e. $\Delta$Me > $\Delta$MeO), the step 9 is executed to read a value of the coefficient KAFC corresponding to a value of a control variable NAFC from a fuel increasing coefficient KAFC table. The control variable NAFC is set to zero immediately after the engine has been determined to have recovered from a fuel cut effecting condition, and is thereafter increased by 1 each time each TDC signal pulse is generated until it reaches a predetermined value.

Figure 4:
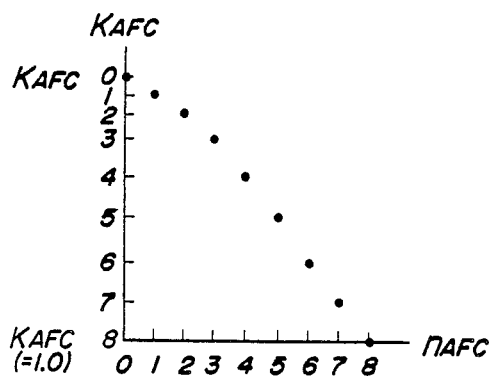
FIG. 4 is a graph showing an example of the table of the relationship between the fuel increasing coefficient KAFC and a control variable NAFC.

An example of the KAFC table is shown in FIG. 4. As shown in the figure, the coefficient KAFC is set to its initial value KAFC0 (>1.0) when the value of the control variable NAFC is zero. Thereafter, as the value of the control variable NAFC is increased by 1 each time each TDC signal pulse is generated after the termination of a fuel cut operation, as stated before, the value of the coefficient KAFC decreases correspondingly from its maximum or initial value KAFC0, and is set to 1.0 (KAFC8=1.0) when the control variable NAFC reaches the predetermined value, e.g. 8 in the FIG. 4 example.

The value of the coefficient KAFC set at the step 9 is applied to the equation (1) to calculate the valve opening period TOUT of the fuel injection valves 10, so that a quantity of fuel increased by the fuel increasing coefficient KAFC is supplied to the engine (the step 5).

If the answer to the question at the step 6 is no, that is, when the first loop has already been executed after the termination of a fuel cut operation, the program proceeds to the step 7 wherein it is determined whether or not the value of the coefficient KAFC, which was set at the step 4 or 9 upon generation of the preceding pulse of the TDC signal, is equal to 1.0. When the value of the coefficient KAFC is larger than 1.0 and accordingly the fuel increasing operation by the use of the same coefficient is still continued, the program executes the step 8 et seq., while when the answer to the question at the step 7 is yes, that is, when the value of the coefficient KAFC is equal to 1.0, it is judged that the fuel increasing operation by the use of the coefficient KAFC has been terminated, and then the program skips over the steps 8 and 9 to the step 5.

Figure 5:
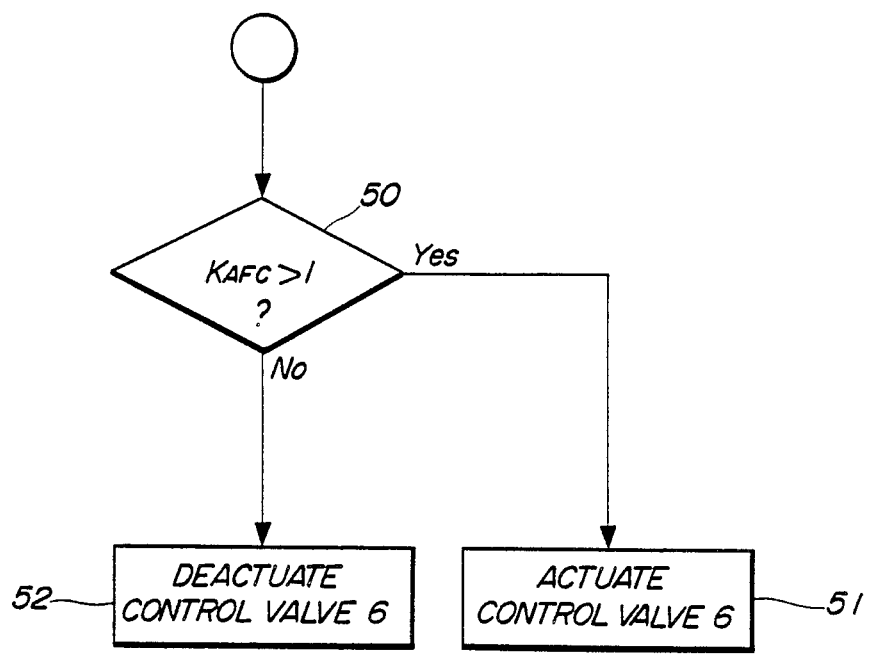
FIG. 5 is a flow chart showing a manner of controlling a supplementary air quantity control valve for regulating the quantity of intake air.

FIG. 5 shows a flow chart of a control program for controlling the control valve 6 in FIG. 1, at the transition of engine operation from a fuel cut effecting condition to a normal fuel supplying condition while the engine is decelerating with the throttle valve fully closed, for control of the quantity of intake air being supplied to the engine. The present program is executed upon generation of each pulse of the TDC signal, at least after the execution of the subroutine shown in FIG. 3.

First, at the step 50, it is determined whether or not the value of the fuel increasing coefficient KAFC, which was set by the subroutine of FIG. 3, is larger than 1.0. If the answer is yes, that is, when the relationship KAFC>1 stands, it is judged that the engine is operating in a condition wherein the fuel quantity is increased by the use of the coefficient KAFC after the termination of a fuel cut operation. Therefore, the program proceeds to the step 51 to open the control valve 6 in FIG. 1 until the next TDC signal pulse is generated, to thereby increase the quantity of intake air. The step 51 is repeatedly executed as long as the value of the coefficient KAFC remains above 1.0, so as to continually carry out the intake air quantity increasing operation. As stated before, the fuel increasing coefficient KAFC is set to a value larger than 1.0 only when the engine is operating in a condition wherein a fuel cut operation has been terminated at deceleration of the engine with the throttle valve fully closed and at the same time the rate of decrease in the engine speed is larger than the predetermined value $\Delta$MeO. Such operating condition of the engine substantially corresponds to one wherein the charging efficiency of intake air decreases. Therefore, when the value of the coefficient KAFC is larger than 1.0, the quantity of intake air is increased by actuating the control valve 6, thereby compensating for a shortage in the intake air quantity caused by the decreased charging efficiency at deceleration of the engine with the throttle valve fully closed.

If the answer to the question at the step 50 is no, that is, when the relationship KAFC=1.0 stands, it is judged that the period of time for increasing the intake air quantity through actuation of the control valve 6 has already elapsed, or that the quantity of intake air should not be increased at the moment. Accordingly, the control valve 6 is closed at the step 52.

According to the above embodiment, the quantity of intake air is regulated by the control valve 6 which opens and closes the air passage 8 bypassing the throttle valve 5. However, the manner of controlling the intake air quantity is not limited to the above one. For instance, the intake air quantity may alternatively be regulated by an apparatus which is adapted to forcibly open the throttle valve to a predetermined opening from its fully closed position, as disclosed by U.S. Pat. No. 3,707,892 issued on Jan. 2, 1973 in the names of Takashi Kuroda and Yasuo Katsutomi.

What is claimed is:

1. A method of controlling the quantity of intake air being supplied to an internal combustion engine, said engine having an intake passage, a throttle valve arranged in said intake passage, and means for increasing the quantity of intake air being supplied to said engine by a required amount in response to operating conditions of said engine, said method comprising the steps of: (a) interrupting the fuel supply to said engine at deceleration of said engine with said throttle valve fully closed; (b) determining whether or not a predetermined condition that the engine rotational speed is lower than a predetermined low value that is higher than a normal idle speed of the engine is satisfied for terminating the interruption of the fuel supply to said engine, which is carried out at deceleration of said engine with said throttle valve fully closed; (c) detecting a rate of decrease in the rotational speed of said engine; (d) comparing the detected rate with a predetermined value; and (e) increasing the quantity of fuel being supplied to said engine for a limited period of time, and at the same time actuating said intake air quantity increasing means for said limited period of time to supply a supplementary quantity of intake air, immediately after it is determined that said predetermined condition is satisfied, while at the same time the detected rate of decrease is larger than said predetermined value.

2. A method as claimed in claim 1, wherein said step (e) comprises supplying said engine with an additional quantity of air through said intake air quantity increasing means, in addition to a quantity of intake air normally supplied through said throttle valve.

3. A method as claimed in claim 1, wherein said step of increasing the fuel quantity is executed by multiplying a basic value of fuel quantity determined as a function of at least one operating parameter of said engine by a predetermined fuel increasing coefficient.

* * * * *